(12) United States Patent
Franceschini et al.

(10) Patent No.: US 8,479,062 B2
(45) Date of Patent: Jul. 2, 2013

(54) PROGRAM DISTURB ERROR LOGGING AND CORRECTION FOR FLASH MEMORY

(75) Inventors: Michele M. Franceschini, White Plains, NY (US); Ashish Jagmohan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/959,993

(22) Filed: Dec. 3, 2010

(65) Prior Publication Data
US 2012/0144249 A1    Jun. 7, 2012

(51) Int. Cl.
*G11C 29/00* (2006.01)
(52) U.S. Cl.
USPC ............................. 714/723; 714/763
(58) Field of Classification Search
USPC .................................. 714/723, 763
See application file for complete search history.

(56) References Cited

U.S. PATENT DOCUMENTS

| | | | |
|---|---|---|---|
| 4,189,781 A | 2/1980 | Douglas | |
| 5,532,962 A | 7/1996 | Auclair et al. | |
| 5,867,642 A | 2/1999 | Vivio et al. | |
| 5,909,449 A | 6/1999 | So et al. | |
| 7,012,835 B2* | 3/2006 | Gonzalez et al. | 365/185.11 |
| 7,293,203 B1 | 11/2007 | Coatney et al. | |
| 7,346,812 B1 | 3/2008 | Wickeraad | |
| 7,362,611 B2 | 4/2008 | Roohparvar | |
| 7,451,355 B1 | 11/2008 | Coatney et al. | |
| 7,477,547 B2 | 1/2009 | Lin | |
| 7,617,074 B2 | 11/2009 | Beish et al. | |
| 7,624,129 B2 | 11/2009 | Jung et al. | |
| 8,095,851 B2* | 1/2012 | Diggs et al. | 714/763 |
| 8,145,977 B2* | 3/2012 | Lee | 714/763 |
| 2002/0091718 A1 | 7/2002 | Bohannon et al. | |
| 2008/0005192 A1 | 1/2008 | Jung et al. | |
| 2009/0100315 A1* | 4/2009 | Lee | 714/763 |
| 2010/0195384 A1* | 8/2010 | Sharon et al. | 365/185.02 |

OTHER PUBLICATIONS

S. Schechter et al. "Use ECP, not ECC, for Hard Failures in Resistive Memories"; ISCA '10; Jun. 19-23, 2010; pp. 1-12.
Stefano Gregori et al. "On-Chip Error Correcting Techniques for New-Generation Flash Memories"; pp. 602-616; Proceedings of the IEEE, vol. 91, No. 4; Apr. 2003.

* cited by examiner

*Primary Examiner* — Yolanda L Wilson
(74) *Attorney, Agent, or Firm* — Cantor Colburn LLP; Dwayne Nelson (57) ABSTRACT

Program disturb error logging and correction for a flash memory including a computer implemented method for storing data. The method includes receiving a write request that includes data and a write address of a target page in a memory. A previously programmed page at a specified offset from the target page is read from the memory. Contents of the previously programmed page are compared to an expected value of the previously programmed page. Error data is stored in an error log in response to contents of the previously programmed page being different than the expected value of the previously programmed page, the error data describing an error in the previously programmed page and the error data used by a next read operation to the previously programmed page to correct the error in the previously programmed page. The received data is written to the target page in the memory.

25 Claims, 8 Drawing Sheets

PROGRAM DISTURB ERROR LOGGING AND CORRECTION FOR FLASH MEMORY

BACKGROUND

The present invention relates generally to computer memory, and more specifically to program disturb error logging and correction in not-and (NAND) flash memory.

Phase-change memories (PCMs) and flash memories are examples of non-volatile memories with limited endurance (also referred to as a "limited life"). Such memories have limited endurance in the sense that after undergoing a number of writing cycles (RESET cycles for PCM, program/erase cycles for flash memory), the memory cells wear out and may no longer be able to reliably store information. In addition, flash memory may be affected by errors in surrounding pages that are introduced while writing data to a page. These types of errors are referred to as disturb errors.

Contemporary NAND flash memory devices do not support page level erases. The absence of page erases, implies that once a page is written, it cannot be rewritten until the entire block (e.g., made up of sixty-four pages) is erased. If a logical address corresponding to a page needs to be refreshed, this is accomplished by marking the page as invalid and mapping the logical block address to a different physical page. Disturb errors, however, may cause the bits of the erased pages to appear to be written (i.e. changed from '1' to '0'. Because individual pages cannot be erased, disturb errors in blank pages may cause faulty values in data that is subsequently written to those pages.

In addition, disturb errors in memory may affect previously written pages by flipping bits from the programmed value to a new value. Typically these errors are undetectable and only manifest themselves once the data is read from memory. Error correction codes may be used to protect data stored in NAND flash devices. Though suited for their intended purpose, these correction codes, however, may not be able to correct disturb errors properly and/or efficiently.

SUMMARY

An embodiment is a computer implemented method for storing data that includes receiving a write request that includes data and a write address of a target page in a memory. A previously programmed page at a specified offset from the target page is read from the memory. Contents of the previously programmed page are compared to an expected value of the previously programmed page. Error data is stored in an error log in response to contents of the previously programmed page being different than the expected value of the previously programmed page, the error data describing an error in the previously programmed page and the error data used by a next read operation to the previously programmed page to correct the error in the previously programmed page. The received data is written to the target page in the memory.

Another embodiment is a system that includes an encoder in communication with a memory. The encoder is for performing a method that includes receiving a write request that includes data and a write address of a target page in a memory. A previously programmed page at a specified offset from the target page is read from the memory. Contents of the previously programmed page are compared to an expected value of the previously programmed page. Error data is stored in an error log in response to contents of the previously programmed page being different than the expected value of the previously programmed page, the error data describing an error in the previously programmed page and the error data used by a next read operation to the previously programmed page to correct the error in the previously programmed page. The received data is written to the target page in the memory.

Another embodiment is a computer implemented method for retrieving data. The method includes receiving a read request that includes a read address of a page in a memory. The read word is read from the page. Contents of an error log associated with the page are retrieved. The error log includes error data describing any errors identified during a write operation to a second page. The write operation to the second page is subsequent to a write operation to the page and within a specified offset from the page. Read data responsive to the read word and to the contents of the error log is generated and output.

A further embodiment is a system that includes a decoder in communication with a memory. The decoder is for performing a method that includes receiving a read request that includes a read address of a page in a memory. The read word is read from the page. Contents of an error log associated with the page are retrieved. The error log includes error data describing any errors identified during a write operation to a second page. The write operation to the second page is subsequent to a write operation to the page and within a specified offset from the page. Read data responsive to the read word and to the contents of the error log is generated and output.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

An embodiment is directed to improving the reliability of not-and (NAND) flash memories. NAND flash memories are a popular class of non-volatile memories that are being used increasingly in a diverse set of storage systems, from enterprise storage servers, to portable electronic systems. The main advantages of such memories are their low cost and high density. On the other hand, they suffer from a lack of endurance, as well as the existence of certain types of errors which detract from reliability and whose negative effects become more prominent with wear. One such type of errors is referred to as disturb errors, which occur when a page of data is written to NAND flash memory. Disturb errors cause bits in surrounding pages to be altered, thereby affecting the data stored in the memory.

Because each flash memory block is typically written to sequentially, one page at a time, pages ahead of the currently written page, in the same block, are blank, while pages prior to the currently written page, in the same block, contain data that was written to memory previously. Flash memory is generally impacted by two types of disturb errors, forward disturb errors that affect blank pages ahead of the currently written page, and backwards disturb errors that affect already written pages prior to the currently written page, in the same block.

Both forward and backward disturb errors occur in a range of a finite number of pages from the currently written page, in the same block. Therefore, forward and backward disturb can be compensated for using the techniques described herein. In forward disturb errors, bits of the pages ahead of the currently written pages are flipped. Therefore, rather than being a blank page, forward pages may actually have some of their bits set to a value. In backward disturb errors, the bits of pages prior to the currently written page are flipped thereby changing the value of the previously stored pages. As described herein, forward disturb errors are compensated for by reading the target page in memory for the page that is to be written, and applying encoding to the data that is to be written to memory using an encoding method that provides protection against this type of error (i.e. stuck bit encoding) before it is written to the memory.

The existence of any backward disturb errors, however, is not known at the time that the page is written to memory because the effects of backward disturb occur after the data has been written. Furthermore, because the entire block of flash memory must be erased before a page is rewritten, backward disturb, even if detected, cannot be corrected in place. In an embodiment described herein, backward disturb errors are detected by storing a copy of programmed page data in a cache. As each page is written, a previous page that is no longer susceptible to backward disturb errors is read from the flash memory and compared to the bit-values for that page stored in the cache. Discrepancies in the two sets of bit-values include bit errors caused by backward disturb errors. These discrepancies are logged and stored. When the page is later read from memory, the error log is retrieved and used to correct the errors in the page, and the encoding (e.g., stuck bit encoding) is reversed before it is returned to the requestor. Note that the pages have been assumed to consist of bits for simplicity of explanation. As will be understood by one of ordinary skill in the art, it is straightforward to extend this technique to the case where each page is made up of non-binary symbols.

Disturb errors may be a major source of errors in typical flash devices. Examples of such disturb errors include floating gate coupling errors, word-line errors and bit-line errors. A significant proportion of the errors caused by such disturbs are localized (i.e. disturb errors are caused in pages which are near by the pages being written to). Specifically programming a certain page "i" in the memory may cause significant disturb errors in pages $i-n_b$ through $i+n_f$, where $n_b$ is the number of pages in memory before page i that may be affected by program disturb, and $n_f$ is the number of pages ahead of the page i that may be affected by program disturb. Because these errors occur over a predictable area around page i, they can be corrected.

In an embodiment, two techniques are used to compensate for errors in the flash memory. First, prior to programming an erased page, the page in the memory that is to be programmed is read to detect if there are any existing non-erased cells on the page due to program disturbs from the pages written immediately prior. These disturb errors are compensated for by using a code to generate a word that is consistent with such cell errors (e.g., stuck bit encoding). The second technique described herein includes using a program page cache to store the last $n_b$ data pages written into the flash memory. After programming page i, the page $i-n_b$ written $n_b$ program steps ago is read and compared to the data in the cache. Any errors detected (i.e. differences between the read page and the cached version of the page) are logged. In an embodiment, the errors are logged in a flash translation layer table (which maps logical to physical addresses), and/or in a spare area of page i+1 or page i. This allows the errors to be compensated for without requiring expensive rewrites of prior pages. A significant increase in reliability may be achieved inexpensively by using such error logging.

Figure 1:
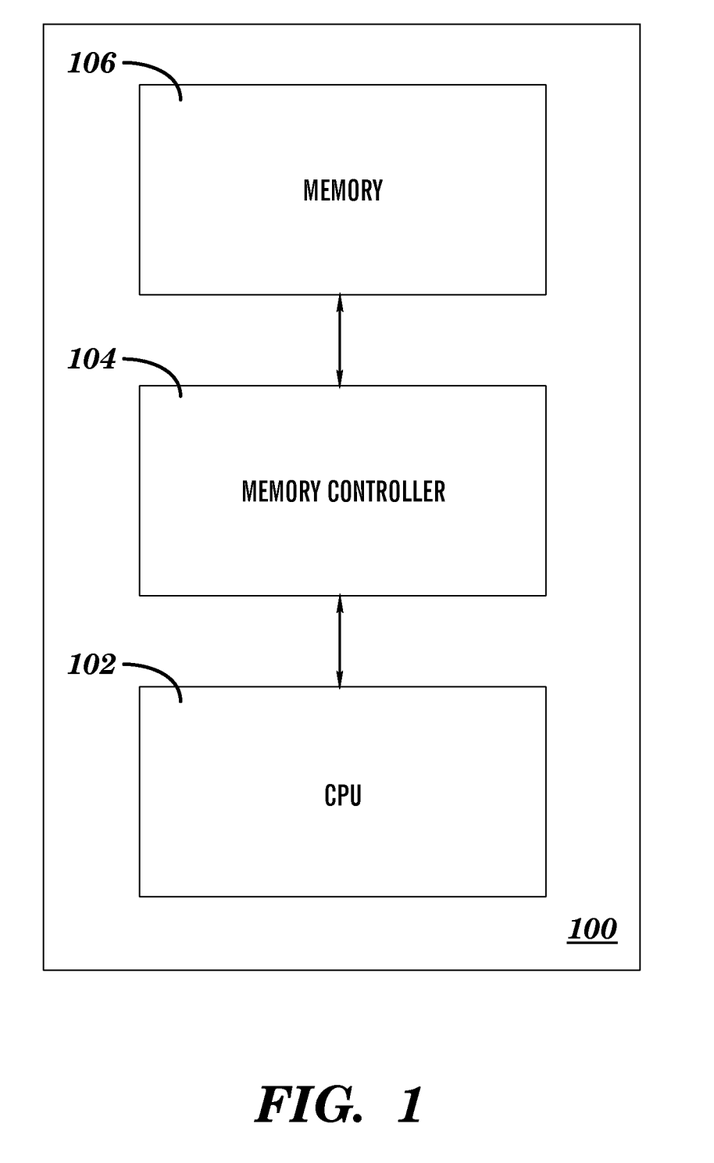
FIG. 1 illustrates a block diagram of a system for storing and retrieving data in a memory in accordance with an embodiment.

FIG. 1 illustrates a block diagram of a system for storing and retrieving data in a memory in accordance with an embodiment. A system 100 depicted in FIG. 1 includes a computer processor 102, a memory 106 having memory cells, and a memory controller 104 for receiving data from the computer processor 102 to be stored in the memory 106. In an embodiment, the memory cells are arranged into pages, and pages are arranged into blocks. Thus, a block may contain a plurality of pages, each page containing a plurality of memory cells.

In one embodiment the memory controller 104 is communicatively coupled to the computer processor 102 and receives write requests from the computer processor 102. The write requests contain data to be written to the memory 106 and a logical address for identifying the location in the memory 106 to which the data will be written. The memory controller 104 stores data at a physical address within the memory 106. In an embodiment, the memory controller 104 maps the logic address to a physical address in the memory 106 when storing or retrieving data. The physical address for a given logical address can change each time data in the memory 106 is modified.

The system 100 is one example of a configuration that may be utilized to perform the processing described herein. Although the system 100 has been depicted with only a single memory 106, memory controller 104, and computer processor 102, it will be understood that other embodiments would also operate in other systems with two or more of the memory 106, memory controller 104, or computer processor 102. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
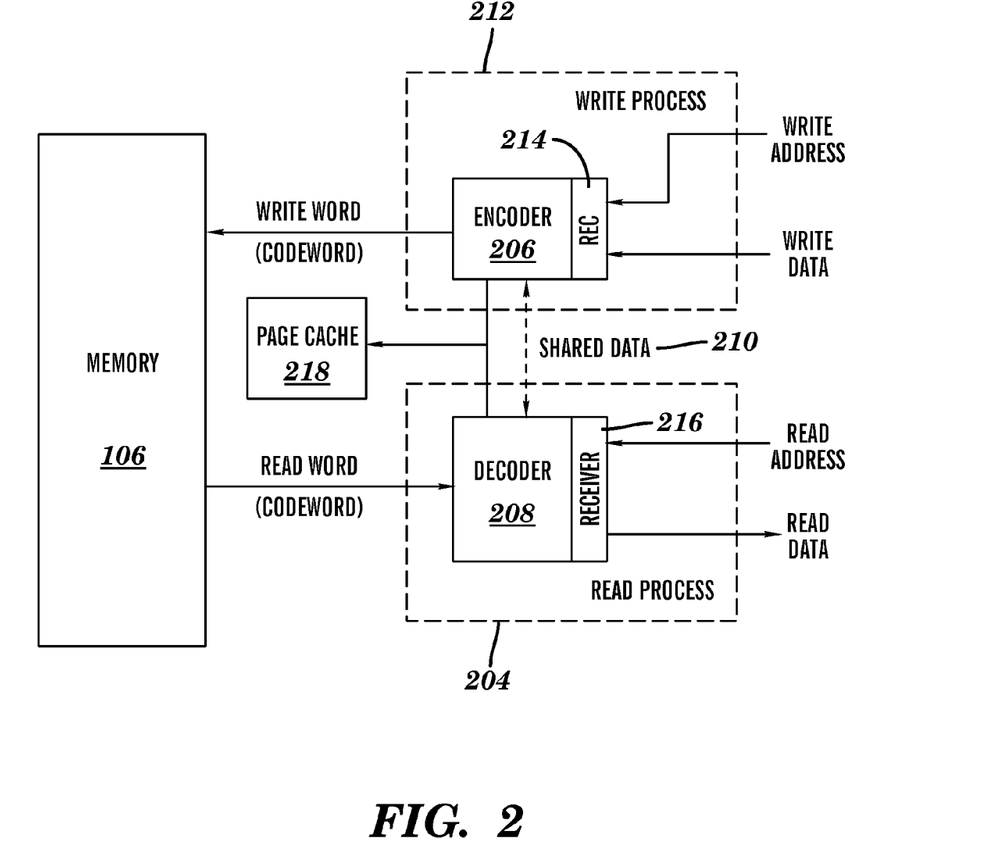
FIG. 2 illustrates a block diagram of a system for encoding and decoding data in a memory in accordance with an embodiment.

FIG. 2 illustrates a block diagram of a system for storing and retrieving data in a memory in accordance with an embodiment. The system depicted in FIG. 2 includes the memory 106 having blocks of memory cells (each block made up of pages), an encoder 206 for receiving write data and generating an encoded write word for storage in the memory cells, a decoder 208 for receiving a read word from the memory and decoding and generating read data, and shared data 210 storing characteristics of the stored data for use by both the encoder 206 and the decoder 208. In an embodiment, the encoder 206 and shared data 210 are utilized by a write process 212, and the decoder 208 and shared data 210 are utilized by a read process 204.

In one embodiment the encoder 206, decoder 208, and shared data 210 are located on a memory controller such as the memory controller 104 of FIG. 1, or a memory module such as memory 106 of FIG. 1. In an alternate embodiment, the encoder 206, decoder 208, and shared data 210 are located on a memory device (not shown) or in a separate encoding or decoding module communicatively coupled to the memory controller 104 or the memory 106. The shared data 210 may be stored in a register or any other storage location that is accessible by both the encoder 206 and the decoder 208.

In one embodiment, the memory 106 is implemented by NAND flash memory devices or other non-volatile memory devices such as, but not limited to: phase change memory (PCM) devices.

Inputs to the encoder 206 depicted in FIG. 2 include the address of the page to be written (also referred to herein as a "write address"), and the data to be written to the page (also referred to herein as "write data"). As shown in FIG. 2, the inputs are received via a receiver 214 located on the encoder 206. In an embodiment, the inputs are received via a receiver 214 (e.g., located on a memory device, memory module, memory controller, or other location). The receiver 214 may be implemented in a variety of manners including hardware for receiving the inputs and/or a storage location (e.g., a register) where the inputs are located.

An input to the decoder 208 depicted in FIG. 2 includes the address of the memory location (e.g., a page) to be read. In an embodiment, the input is received via a receiver 216 (e.g., located on a memory device, memory module, memory controller, or other location). The receiver 216 may be implemented in a variety of manners including hardware for receiving the inputs and/or a storage location (e.g., a register) where the inputs are located. Although the receivers 214 and 216 are depicted relative to the encoder 206 and decoder 208 respectively, it will be understood that in other embodiments, the receivers 214 and 216 may by located externally to the encoder 206 and the decoder 208. In further embodiments, the receivers 214 and 216 may be physically located in a single module configured to receive both read and write requests.

An output from the decoder 208 depicted in FIG. 2 includes the read data. In an embodiment, the outputting is by a transmitter (e.g., located on a memory device, memory module, memory controller, or other location). The transmitter (not shown) may be implemented in a variety of manners including hardware for transmitting the output and a storage location or register where the outputs are stored. The encoder 206 and decoder 208 are examples of computers that may be utilized to perform the processing described herein.

Both the encoder 206 and the decoder 208 are communicatively coupled to a page cache 218. In another embodiment, only the encoder is communicatively coupled to the page cache 218. In an embodiment, the encoder 206 stores and retrieves copies of the write data in the page cache 218 for use by the encoder 206 in detecting errors in pages of memory caused by backward disturb. In an embodiment, the page cache 218 is large enough to store "n" pages of data where n is the maximum number of pages that can be affected by backward disturb. In an alternate embodiment the page cache 218 is expanded over time as the number of pages affected by backward disturb increases. The page cache 218 may be a flash memory cache or any other cache media as would be understood in the art. In alternate embodiments, the page cache 218 may be a disk storage device, or other device for storing data as is known in the art.

Figure 3A:
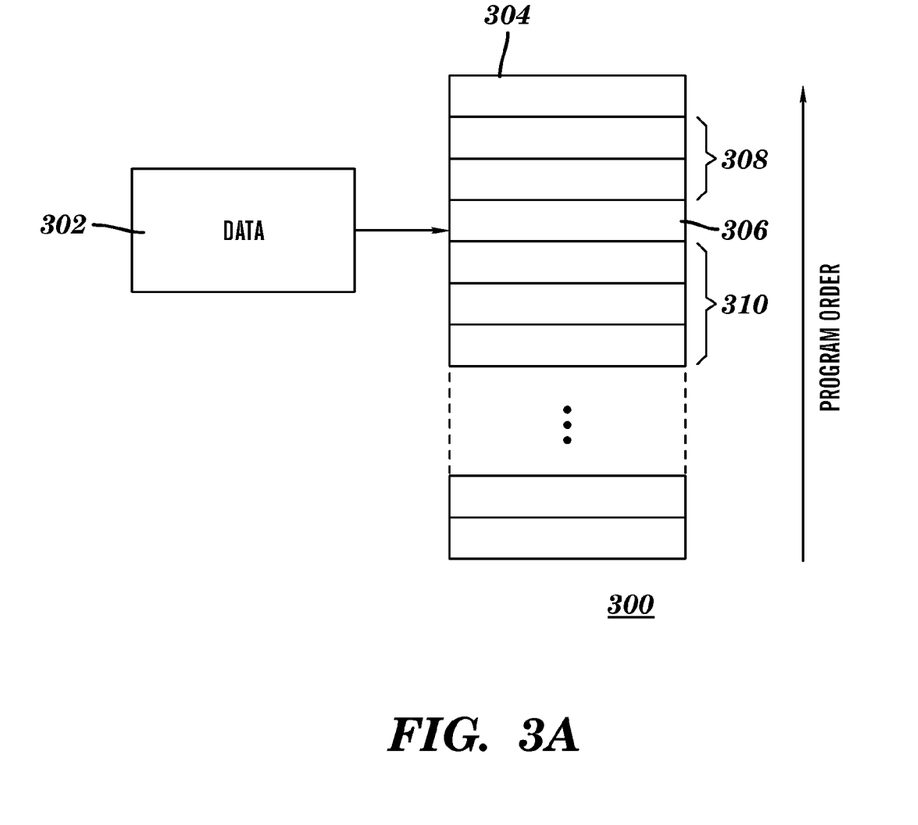
FIG. 3a illustrates a block diagram of memory pages in a NAND flash memory in accordance with an embodiment.

FIG. 3a depicts a flash memory 300 for storing data in an embodiment where the flash memory 300 is a NAND flash memory (also referred to herein as "flash memory"), such as the memory 106 of FIG. 1. The flash memory 300 includes a number of memory pages 304, each of the memory pages 304 are made up of bits. The memory pages 304 are programmed with data such as data 302, which is received at the flash memory 300. In an embodiment, the data 302 is received from a memory controller, such as memory controller 104 of FIG. 1. In other embodiments, the data 302 is received directly from a computer processor, such as computer processor 102 of FIG. 1 or from a memory bus (not shown). In an embodiment, the memory pages 304 are located adjacent to each other and are programmed with data in a specific program order. As a page of the memory pages 304 is programmed, such as target page 306, the surrounding pages of the flash memory, such as forward pages 308 and backward pages 310 are affected by an electrical signal that is produced when programming the target page 306. The forward pages 308 may be affected by forward disturb errors, and the backward pages 310 may be affected by backward disturb errors.

These forward and backward disturb errors change the bit values of the pages in the forward pages 308 and the backward pages 310 respectively. Because the flash memory 300 is programmed sequentially, the forward pages 308 are blank (i.e. all 1's) until data is written to them. In the case of a forward disturb errors, however, one or more bits of the forward pages 308 is switched from a 1 to a 0, which simulates a data write to the forward pages 308. When the data 302 is written to a page that has experienced a forward disturb error, the bits are not reset again before writing, and therefore errors are introduced to the data as it is written to the flash memory 300.

Similarly, backward disturb errors affect the bit values of the backward pages 310. However, unlike the forward pages 308, which are supposed to be blank, the backward pages 310 have already had data written to them. Therefore, when a backward disturb error changes bits in the backward pages 310, the previously written data may be corrupted. Both backward disturb and forward disturb errors act only on pages a limited distance away from the target page 306. In an embodiment, for target page 306 (or page "i"), forward pages i+1 to $n_f$ may be disturbed when data is written to page I ($n_f$ is the number of pages ahead of the page i that may be affected by program disturb). Page $n_f+1$, however, will not be affected by forward disturb. Similarly, when data is written to page i, pages i−1 to page $n_b$ (page $n_b$ is located at a specified offset from the target page—page i) may be affected by program disturb, however, page $n_b-1$ will not be affected by program disturb. In an embodiment, $n_f$ and $n_b$ increase over time as the reliability of the memory pages 304 degrades. Although the flash memory 300 has been depicted as a single memory device, it will be understood that the memory pages 304 may be made up of any number of memory devices.

Figure 3B:
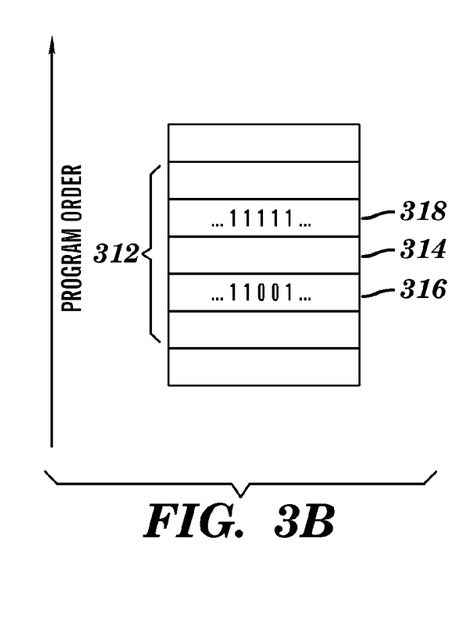
FIG. 3b illustrates a block diagram of memory pages in a NAND flash memory block prior to storing write data in accordance with an embodiment.

FIG. 3b depicts a flash memory for storing write data prior to writing the write data to memory in an embodiment. In an embodiment flash memory is a NAND flash memory, such as the memory 106 of FIG. 1. A maximum disturb area 312 includes both the forward disturb, such as the forward pages 308 of FIG. 3a, and the backward disturb such as the backward disturb 310 of FIG. 3a. In an embodiment, write data is written to a target page 314. Prior to writing the write data to the target page 314, a forward page 318 is blank (i.e. all 1's), and a backward page 316 contains data.

Figure 3C:
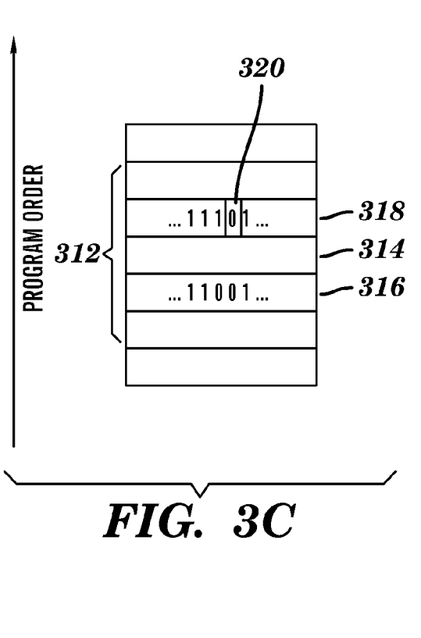
FIG. 3c illustrates a block diagram of memory pages in a NAND flash memory block affected by forward program disturb in accordance with an embodiment.

FIG. 3c depicts a flash memory for storing write data with forward disturb caused by writing the write data to memory in an embodiment. The forward page 318 has been affected by forward disturb at bit 320 changing the value from '1' to '0'.

Figure 3D:
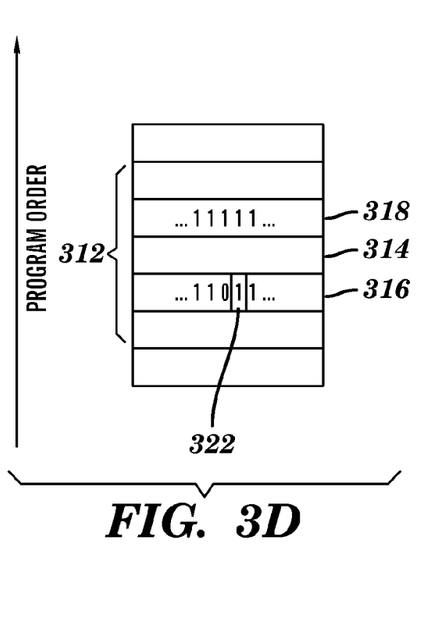
FIG. 3d illustrates a block diagram of memory pages in a NAND flash memory block affected by backward disturb in accordance with an embodiment.

FIG. 3d depicts a flash memory for storing write data with backward disturb error caused by writing the write data to memory in an embodiment. The backward page 316 has been affected by a backward disturb error at bit 322 changing the value from '0' to '1'.

The forward and backward pages of memory affected by disturbs are shown as adjoining the target page for illustrative purposes only. It will be understood by those of ordinary skill in the art that the pages of memory affected by forward and backward disturb can be any page within the maximum disturb area 312. In addition, although the maximum disturb area 312 is depicted as a finite area, it will be understood by those of ordinary skill in the art that the maximum disturb area may be larger or smaller than that illustrated in FIGS. 3b-3d. In addition, in one embodiment, the maximum disturb area is not of a fixed size, and can grow larger or become smaller as the operating conditions of the flash memory change. Furthermore, although the FIGS. 3c-3d depict only a single bit of program disturb, it will be understood that any number of bits may be altered as a result of program disturb. In addition, not all writes to memory will result in program disturb. Furthermore, pages may consist of non-binary symbols rather than bits, and disturbs may cause symbol errors rather than bit errors.

Figure 4:
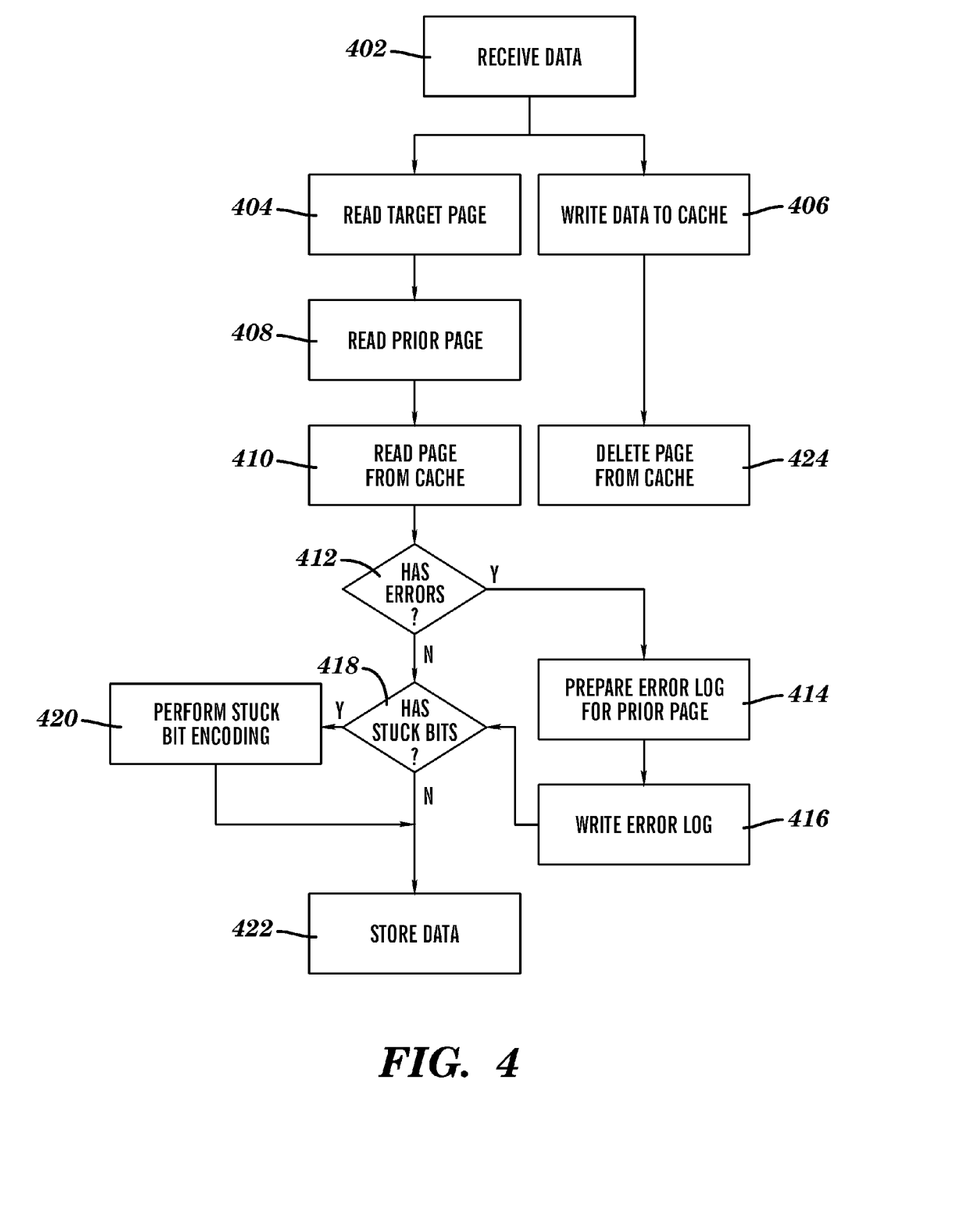
FIG. 4 illustrates a process flow for detecting and logging errors while storing data in accordance with an embodiment.

FIG. 4 depicts a process flow for program disturb error logging and cleaning in an embodiment. In an embodiment, the process flow of FIG. 4 is executed by an encoder, such as encoder 206 of FIG. 2. At block 402, write data is received. In an embodiment, the write data is received as part of a write request from a requestor (not shown) and includes a write address. The write address may be a logical or a physical write address, as is known in the art, and indicates the location in memory (also referred to herein as the "target page"), such as the memory 106 of FIG. 2, where the write data is to be written. At block 404 the target page is read from memory. At block 406, a copy of the write data is written to the page cache 218 of FIG. 2. At block 408, a previously programmed page (i.e., previously written) is read from the memory 106 of FIG. 2. In an embodiment, the previously programmed page that is read is page $n_b-1$ wherein $n_b$ is the number of sequential pages of memory behind the target page that may be affected by backward program disturb. In an alternate embodiment, the page that is read is $n_b$.

At block 410, a cached entry corresponding to the previously programmed page is read from the page cache 218 of FIG. 2. The cached entry includes a copy of the previously programmed page that was previously stored in the page cache 218, such as at block 406 described above. At block 412, the cached entry is compared to contents of the previously programmed page to determine any data corruption caused by backward disturb. In an embodiment, the cache entry and contents of the previously programmed page are compared using an XOR operation. In alternate embodiments, other methods may be used to compare contents of the previously programmed page with the cached entry, such as a bit-by-bit compare, or other methods as would be understood by one of ordinary skill in the art.

If a discrepancy is detected, at block 414, an error log entry containing error data describing the error(s) is prepared. In an embodiment, the error log entry is a compressed bit mask indicating which bits of the previously programmed page are in error. In another embodiment, the error log includes the location of errors and the correct bit value. In alternate embodiments, other methods of logging the specific errors detected in the previously programmed page are used as is known in the art. At block 416, the error log is written to memory. In an embodiment, the error log is appended to the write data and written to the spare area of the page of memory along with the write data. In alternate embodiments, the error log is written to a separate memory device, or a separate area in memory. In yet another embodiment, the log is written partially in the spare area of the page of memory with the write data, and partially in a separate memory device. In a further embodiment, the error log is stored in a cache, such as the page cache 218 of FIG. 2, or another area of memory, and is appended to the subsequent page of write data when it is written to memory. In one embodiment, the log data is compressed using a compression algorithm as is known in the art before it is stored in memory.

At block 418, the target page that was read at block 404 is checked to verify that it is still blank. In an embodiment, the target page is erased as a part of a block of pages in memory that are erased prior to writing. Therefore, the target page should be blank. However, because of forward disturb from writing of previous pages, some bits of the target page may be set in error. In an embodiment, if the page has bits that are set these bits can be treated as if they are stuck bits. Stuck bits are bits that cannot be reset due to either a manufacturing defect, or wear. At block 420, stuck bit encoding is performed on the write data including the error log created at block 416 if it is to be written in the spare area of the target page. In another embodiment, the error log is encoded using a separate stuck-bit code, so that it can be decoded separately from, and without needing to decode, the rest of the write-data. This has the advantage of avoiding dependency chains during decoding. In an embodiment, stuck bit encoding is performed as described in U.S. patent application Ser. No. 12/814,142 filed on Jun. 11, 2010 and titled "Encoding Data into Constrained Memory" which is hereby incorporated by reference in its entirety.

At block 422, the write data is written to the target page in memory 106, and the log is written, either in the spare area of the target page, a separate location in memory, or a combination of both as described above. Error-control coding (ECC) may be done in conjunction with stuck-bit coding at block 420, or it may be done separately at block 422. In an embodiment, the ECC for the error log is done using a separate ECC from the rest of the write data, so that it can be decoded separately from, and without needing to decode, the rest of the write-data. At block 424, the oldest page written to the page cache 218 is purged from cache. Although the process flow is described as operating sequentially, it would be understood by those of ordinary skill in the art that the blocks may be executed in parallel, or in a different order. For example, in one embodiment, the data purge of block 424 can be executed before or after the write to cache of block 406.

Figure 5:
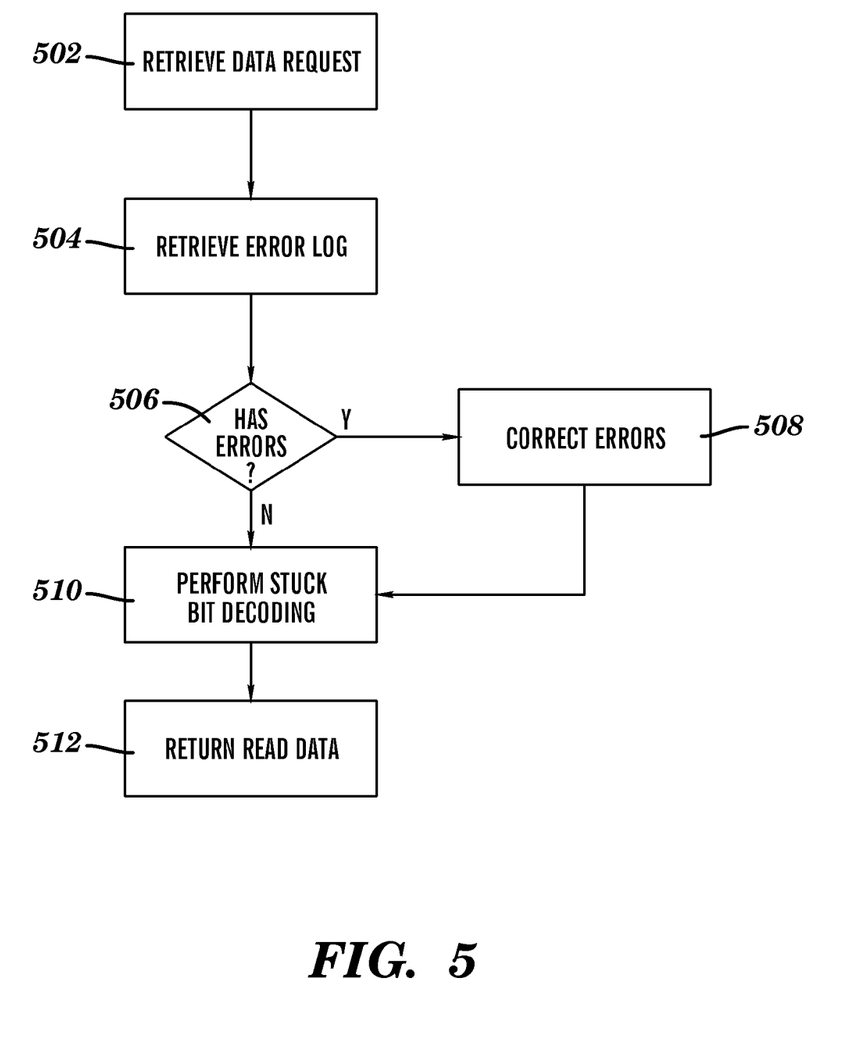
FIG. 5 illustrates a process flow for correcting errors while retrieving data in accordance with an embodiment.

FIG. 5 depicts the retrieval of data from memory such as the memory 106 of FIG. 1 in accordance with an embodiment. In an embodiment, the process flow of FIG. 5 is executed by a decoder, such as decoder 208 of FIG. 2. At block 502, a request to retrieve data is received at the decoder 208. In an embodiment, a read request is received from a requestor (not shown) and includes a read address. The address may be the actual physical address, or the logical address in memory 106 where the data to be read is located. At block 504, the error log associated with the target page is retrieved. In one embodiment, the error log is located in the spare area of a page of memory distinct from the target page. In another embodiment, the error log is located in a separate location in memory. In yet another embodiment, the error log is split and located across both the spare area of a page of memory distinct from the target page and an error log. In further embodiments, the error log is located in a cache memory.

At block 506, the error log is checked to determine if any errors exist in the target page of memory. If the error log indicates that there are errors, then processing continues at block 508 to correct the errors. In an embodiment, the errors are corrected by XORing contents of the error log with the read data as is known in the art. In other embodiments, the bits indicated as erroneous in the log are switched. For example, if a bit is read as a 1 but the error log indicates that the bit is in error, the bit of the read data will be switched to a 0, and vice versa. At block 510, stuck bit decoding is performed on the corrected read data. In another embodiment, ECC decoding is done at block 510 in addition to stuck-bit decoding. If the ECC code is separate from the stuck-bit code, ECC decoding is done first, followed by stuck-bit decoding. At block 512, the read data is returned to the requestor with all corrections applied.

Figure 6:
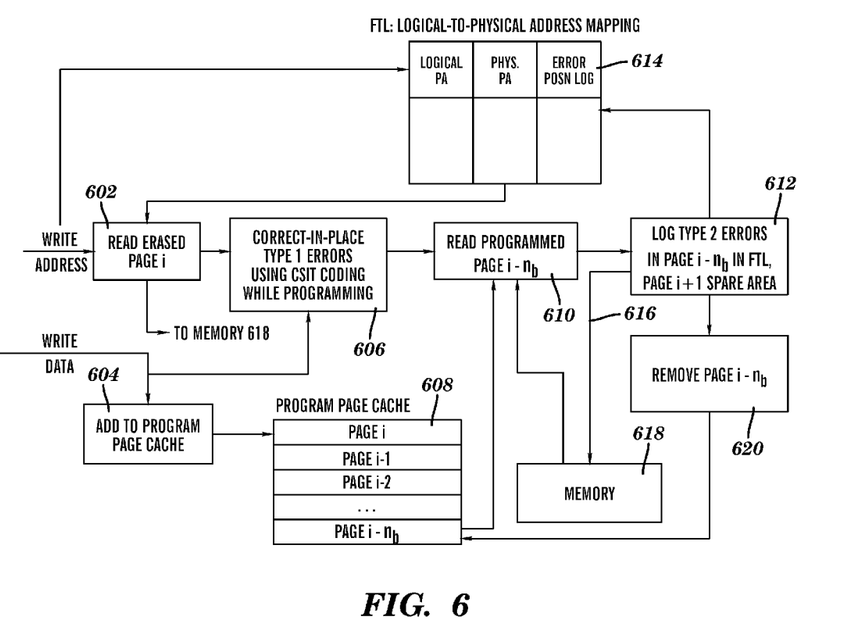
FIG. 6 illustrates a process flow for detecting and logging errors while storing data in accordance with an embodiment.

FIG. 6 depicts a process flow for the logging and handling of errors in write data in accordance with an embodiment. This processing is performed by encoder 206 of FIG. 2. At block 602, a logical write address corresponding to physical write address "i" is received and a target page stored at address i is read from memory 618. The logical-to-physical page address mapping is done using the flash transition layer (FTL) mapping table 614. In an embodiment, the target page corresponds to the write address i, and the target page has been erased prior to receiving the write address. In additional embodiments, the receipt of the write address triggers the erasure of a block of the memory 618, the block containing "x" pages including the target page. At block 604, write data is received and is added to a program page cache 608. In an embodiment, the write data and the write address are received as part of a single write request and are processed in parallel. In other embodiments, the write data and write address are received and processed separately.

At block 606, any errors in the target page of the memory 618, such as those caused by forward disturb, are corrected by encoding the write data with stuck bit logic using methods such as those described above. At block 610, page $i-n_b$ is read from the program page cache 608 and from the memory 618. In one embodiment, the page read from the program page cache 608 is a copy of write data stored at page $i-n_b$ in the memory 618 at the time that the write data was stored in the memory 618. At block 612, the page read from the program page cache 608 (cached page) is compared to the page read from the memory 618 (stored page) and any errors are logged using the results of an exclusive-or (XOR) operation between the bits of the cached page and the bits of the stored page. This XOR operation detects any errors that were created in the stored page based on backward disturb from write operations that occurred after the stored page was written to the memory 618. The error log is saved in a cache or a register and written to the memory 618 on the subsequent write operation at page i+1. In alternate embodiments, the error log is stored in a logical to physical address mapping table 614. In additional embodiments, the error log is split and shared partially in the spare area of the page written to memory and the logical to physical address mapping table 614. At 616, the write data is written to the target page of memory 618 along with the error log created as a result of a previous write request. At block 620, page $i-n_b$ is removed from the program page cache 608.

Figure 7:
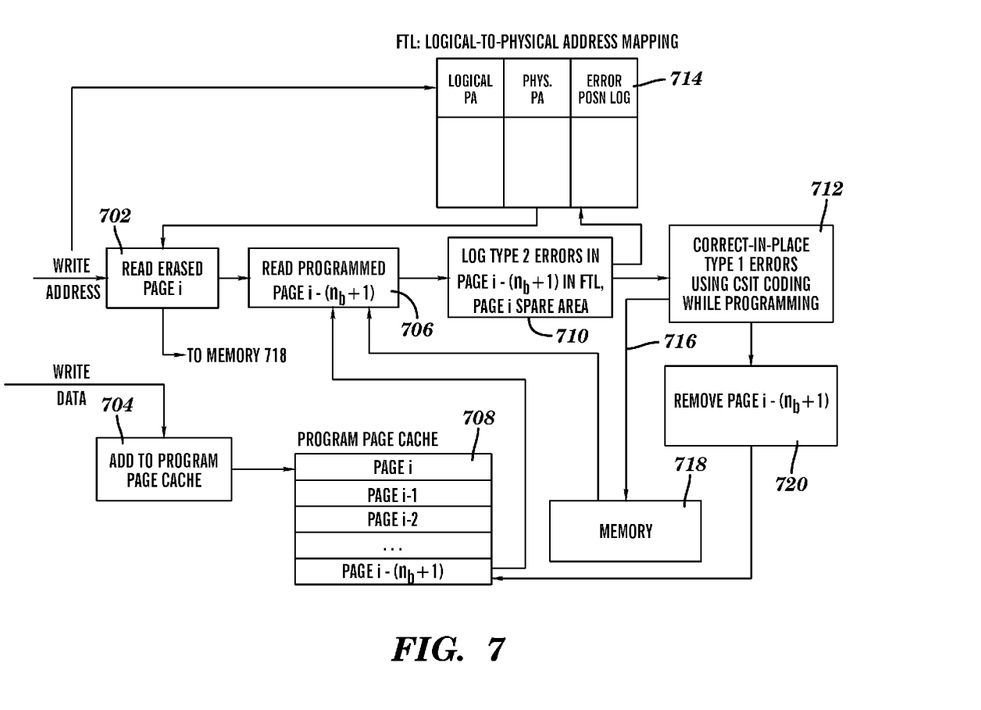
FIG. 7 illustrates a process flow for detecting and logging errors while storing data in accordance with an embodiment.

FIG. 7 depicts a process flow for the logging and handling of errors in write data in an additional embodiment. In an embodiment, the processing is performed by encoder 206 of FIG. 2. At block 702, a write address "i" is received and a target page stored at address i is read from memory 718. In an embodiment, the target page corresponds to the write address i, and the target page has been erased prior to receiving the write address. In additional embodiments, the receipt of the write address triggers the erasure of a block of the memory 718, the block containing "x" pages including the target page. At block 704, write data is received and is added to a program page cache 708. At block 706, page $i-(n_b+1)$ is read from the program page cache 708 and from the memory 718. In an embodiment, the page read from the program page cache 708 is a copy of write data stored at page $i-(n_b+1)$ in the memory 718 at the time that the write data was stored in the memory 718. At block 710, the page read from the program page cache 708 (cached page) is compared to the page read from the memory 718 (stored page) and any errors are logged using the results of an XOR operation between the bits of the cached page and the bits of the stored page. This XOR operation detects any errors that were created in the stored page based on backward disturb from write operations that occurred after the stored page was written to the memory 718. The error log is appended to the write data for storage in the spare area of the target page in the memory 718. In alternate embodiments the error log is stored in a logical to physical address mapping table 714. In additional embodiments, the error log is split and shared partially in the spare area of the target page written to memory and the logical to physical address mapping table 714.

At block 712, once the error log has been appended to the write data, any errors in the target page of the memory 718 that were read from memory at block 702, such as those caused by forward disturb, are corrected by encoding the write data with stuck bit logic using methods such as those described above. At 716, the encoded write data, including the error log, is written to the target page of memory 718. At block 720 page $i-(n_b+1)$ is removed from the program page cache 708.

Technical effects and benefits include improved reliability of error correction for errors caused by forward and backward disturb in flash memory devices. An additional benefit is improved lifetime of a device by increasing the reliability and useable life of the flash memory by accurately and inexpensively correcting errors in the data stored in flash memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for storing data, the method comprising:
   receiving a write request comprising data and a write address of a target page in a memory;
   reading a previously programmed page from the memory, the previously programmed page at a specified offset from the target page;

comparing contents of the previously programmed page to an expected value of the previously programmed page;

storing error data in an error log in response to contents of the previously programmed page being different than the expected value of the previously programmed page, the error data describing an error in the previously programmed page and the error data used by a next read operation to the previously programmed page to correct the error in the previously programmed page; and writing the received data to the target page in the memory.

2. The method of claim 1, further comprising:

reading contents of the target page prior to the writing, wherein the received data is encoded prior to the writing responsive to contents of the target page.

3. The method of claim 2, further comprising storing the encoded data as an expected value of the target page, the expected value of the target page utilized to verify contents of the target page during a future write operation to the memory.

4. The method of claim 1, wherein the expected value of the previously programmed page is stored in a cache memory.

5. The method of claim 1, wherein the comparing comprises at least one of:

performing an exclusive-or operation between the contents of the previously programmed page and the expected value of the previously programmed page; and performing a bit-by-bit compare between the contents of the previously programmed page and the expected value of the previously programmed page.

6. The method of claim 1, wherein the storing error data in an error log comprises one of:

appending the error data to the received data and storing it in a spare area of the memory;

appending a portion of the error data to the received data and storing a portion of the error data in a cache; and storing the error data in the memory separately from the received data.

7. The method of claim 1, wherein the storing the error data in an error log comprises appending the error data to data received in a subsequent write request.

8. A system comprising:

a memory device; and an encoder in communication with the memory device, the encoder configured to perform a method comprising:

receiving a write request comprising data and a write address of a target page in the memory device;

reading a previously programmed page from the memory device, the previously programmed page at a specified offset from the target page;

comparing contents of the previously programmed page to an expected value of the previously programmed page;

storing error data in an error log in response to contents of the previously programmed page being different than the expected value of the previously programmed page, the error data describing an error in the previously programmed page and the error data used by a next read operation to the previously programmed page to correct the error in the previously programmed page; and writing the received data to the target page in the memory device.

9. The system of claim 8, wherein the method further comprises:

reading contents of the target page prior to the writing, wherein the data is encoded prior to the writing responsive to contents of the target page.

10. The system of claim 9, wherein the method further comprises storing the encoded data as an expected value of the target page, the expected value of the target page utilized to verify contents of the target page during a future write operation to the memory device.

11. The system of claim 8, wherein the expected value of the previously programmed page is stored in a cache memory.

12. The system of claim 8, wherein the comparing comprises at least one of:

performing an exclusive-or operation between the contents of the previously programmed page and the expected value of the previously programmed page; and performing a bit-by-bit compare between the contents of the previously programmed page and the expected value of the previously programmed page.

13. The system of claim 8, wherein the storing error data in an error log comprises one of:

appending the error data to the received data and storing it in a spare area of the memory device;

appending a portion of the error data to the received data and storing a portion of the error data in a cache; and storing the error data in the memory device separately from the received data.

14. The system of claim 8, wherein the storing the error data in an error log comprises appending the error data to data received in a subsequent write request.

15. A computer implemented method for retrieving data, the method comprising:

receiving a read request comprising a read address of a page in a memory;

reading a read word from the page;

retrieving contents of an error log associated with the page, the error log comprising error data describing any errors identified during a write operation to a second page, the write operation to the second page subsequent to a write operation to the page and within a specified offset from the page;

generating, at the computer, read data responsive to the read word and to the contents of the error log; and outputting the read data.

16. The method of claim 15, wherein at least a subset of the error log is retrieved from the memory.

17. The method of claim 15, wherein the error log is retrieved from the memory at a location associated with the second page.

18. The method of claim 15, wherein the error log is retrieved from the memory at a location associated with a write operation occurring subsequent to the write operation to the second page.

19. The method of claim 15, wherein at least a subset of the error log is retrieved from a cache.

20. The method of claim 15, wherein the generating the read data comprises:

modifying the read word in response to the contents of the error log; and decoding the modified read word to generate the read data.

21. A system comprising:

a memory device; and a decoder in communication with the memory device, the decoder configured to perform a method comprising:

receiving a read request comprising a read address of a page in the memory device;

reading a read word from the page;

retrieving, at a computer, contents of an error log associated with the page, the error log comprising error data describing any errors identified during a write operation to a second page, the write operation to the second page subsequent to a write operation to the page and within a specified offset from the page;

generating, at the computer, read data responsive to the read word and to the contents of the error log; and outputting the read data.

22. The system of claim 21, wherein the error log is retrieved from at least one of the memory device and a cache.

23. The system of claim 21, wherein the error log is retrieved from the memory device at a location associated with the second page.

24. The system of claim 21, wherein the error log is retrieved from the memory device at a location associated with a write operation occurring subsequent to the write operation to the second page.

25. The system of claim 21, wherein the generating the read data comprises:

modifying the read word in response to the contents of the error log; and decoding the modified read word to generate the read data.

\* \* \* \* \*